Nov. 1, 1932.   D. O. SCOTT   1,886,309
HYDRAULIC BRAKING MECHANISM
Filed Sept. 6, 1927   4 Sheets-Sheet 2
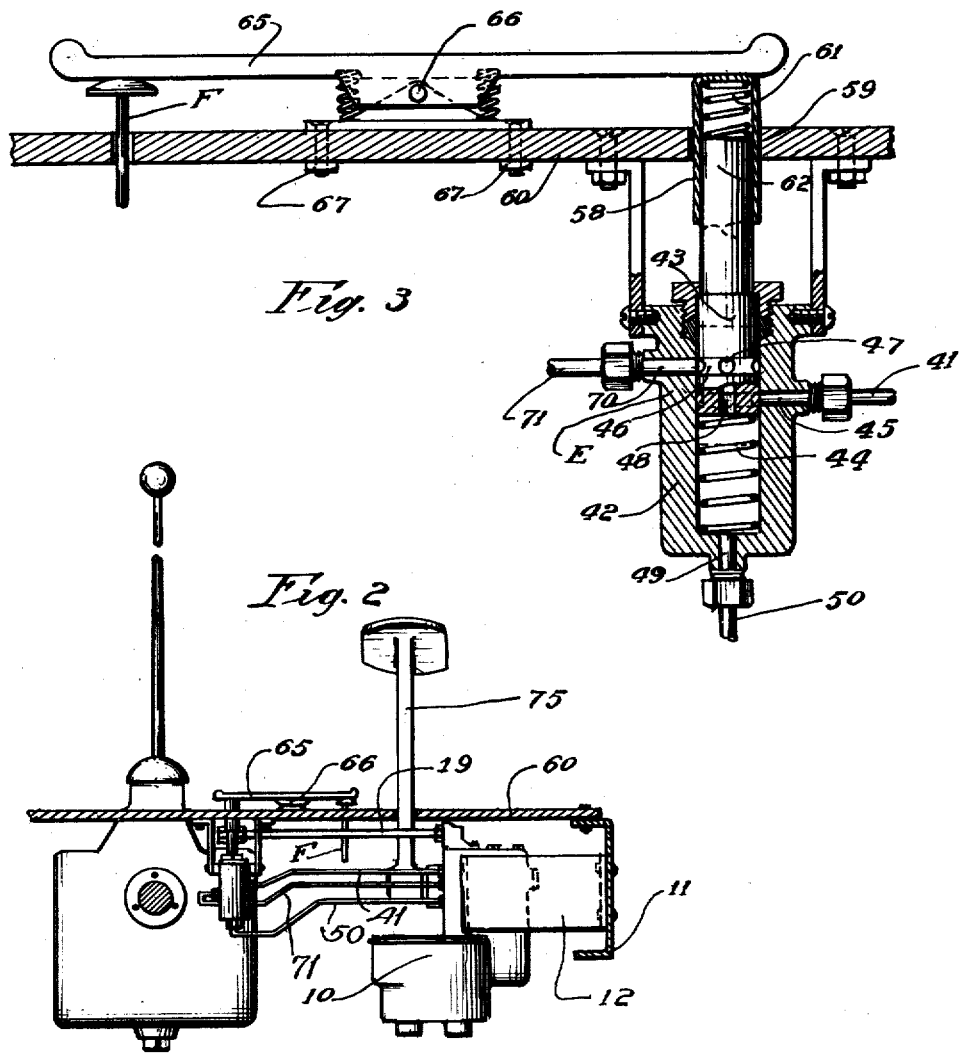

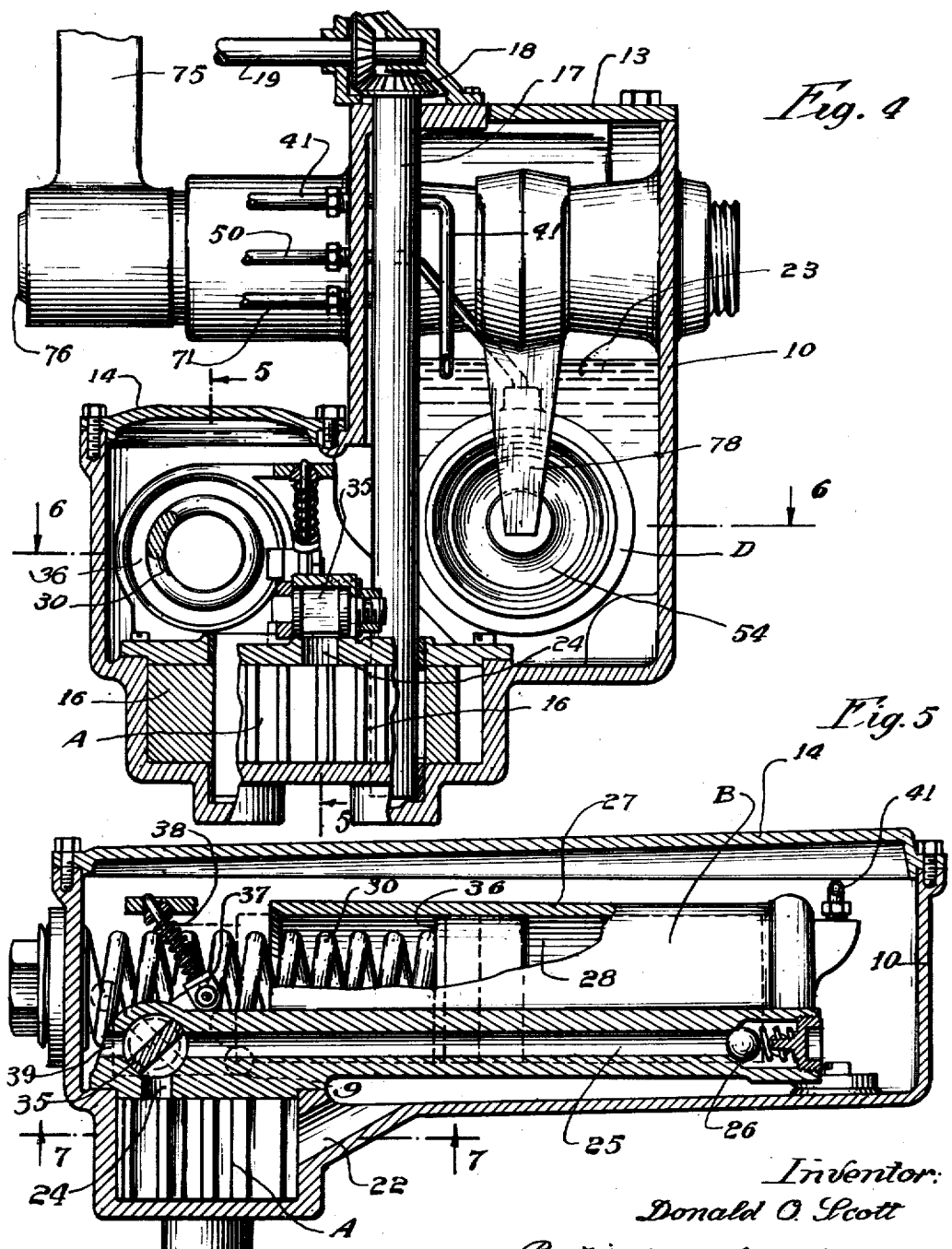

Nov. 1, 1932.   D. O. SCOTT   1,886,309
HYDRAULIC BRAKING MECHANISM
Filed Sept. 6, 1927   4 Sheets-Sheet 4
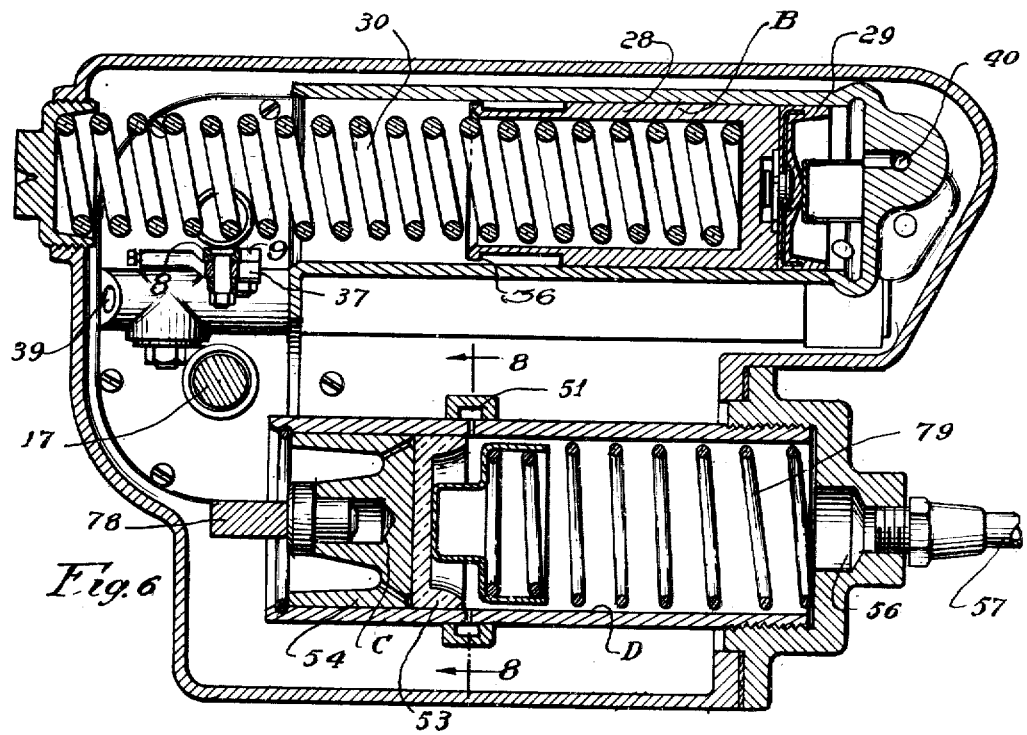
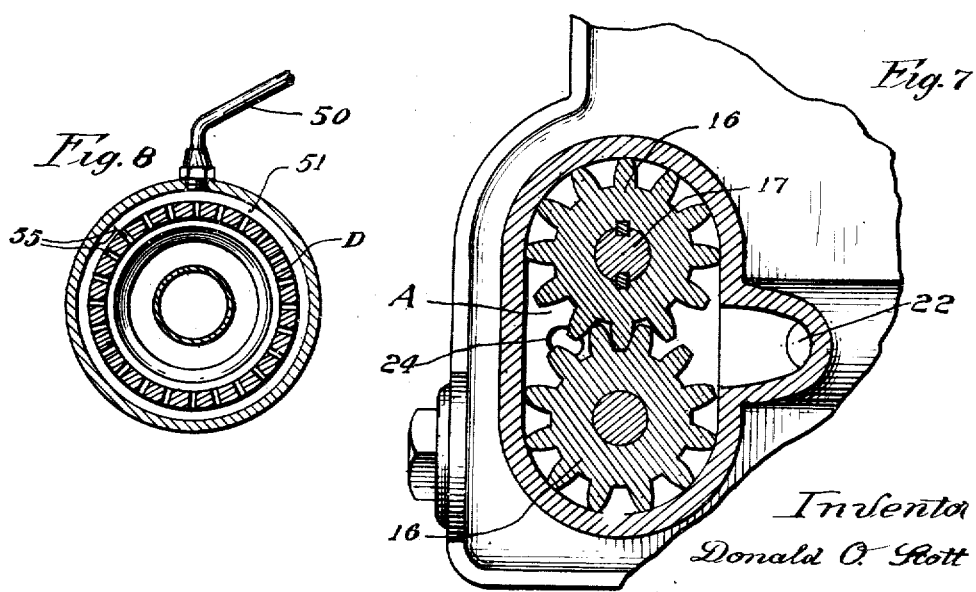
Inventor
Donald O. Scott
By: Williams, Bradbury,
McCaleb & Hinkle
Attys Patented Nov. 1, 1932

1,886,309

UNITED STATES PATENT OFFICE

DONALD O. SCOTT, OF DETROIT, MICHIGAN, ASSIGNOR TO HYDRAULIC BRAKE COMPANY, OF DETROIT, MICHIGAN, A CORPORATION OF CALIFORNIA

HYDRAULIC BRAKING MECHANISM

Application filed September 6, 1927. Serial No. 217,590.

My invention relates to improvements in hydraulic braking mechanism.

The invention will be explained as embodied in the hydraulic braking system for the wheel brakes of a motor vehicle.

The object of the invention is to provide improved hydraulic brakes and controlling means therefor.

A further object is to provide an hydraulic braking mechanism in which pressure is applied to the wheel cylinders of the brakes by manually controlled automatic means and by the application of manual force, independently or simultaneously as well.

A further object is to provide a hydraulic braking mechanism in which the means for controlling the automatic supply of fluid pressure is associated with the accelerator of the motor vehicle by a common foot treadle so that actuation of the accelerator will retard and release the application of fluid pressure or the actuation of the fluid pressure control will retard the accelerator.

A further object is to provide improved hydraulic braking mechanism in which means is provided for maintaining a reserve supply of fluid under pressure at all times in the system which is ample for several applications of fluid pressure to the wheel cylinders.

A further object is to provide an improved hydraulic braking mechanism which when the reserve fluid pressure cylinder is full, automatically relieves back pressure from the pump for supplying the reservoir so that the pump when not in actual use, presents no appreciable load upon its driving connections and source of power.

Other objects and advantages will appear more fully from the accompanying drawings in which:

Fig. 2 is a view substantially along the line 2—2 of Fig. 1,

Figure 1:
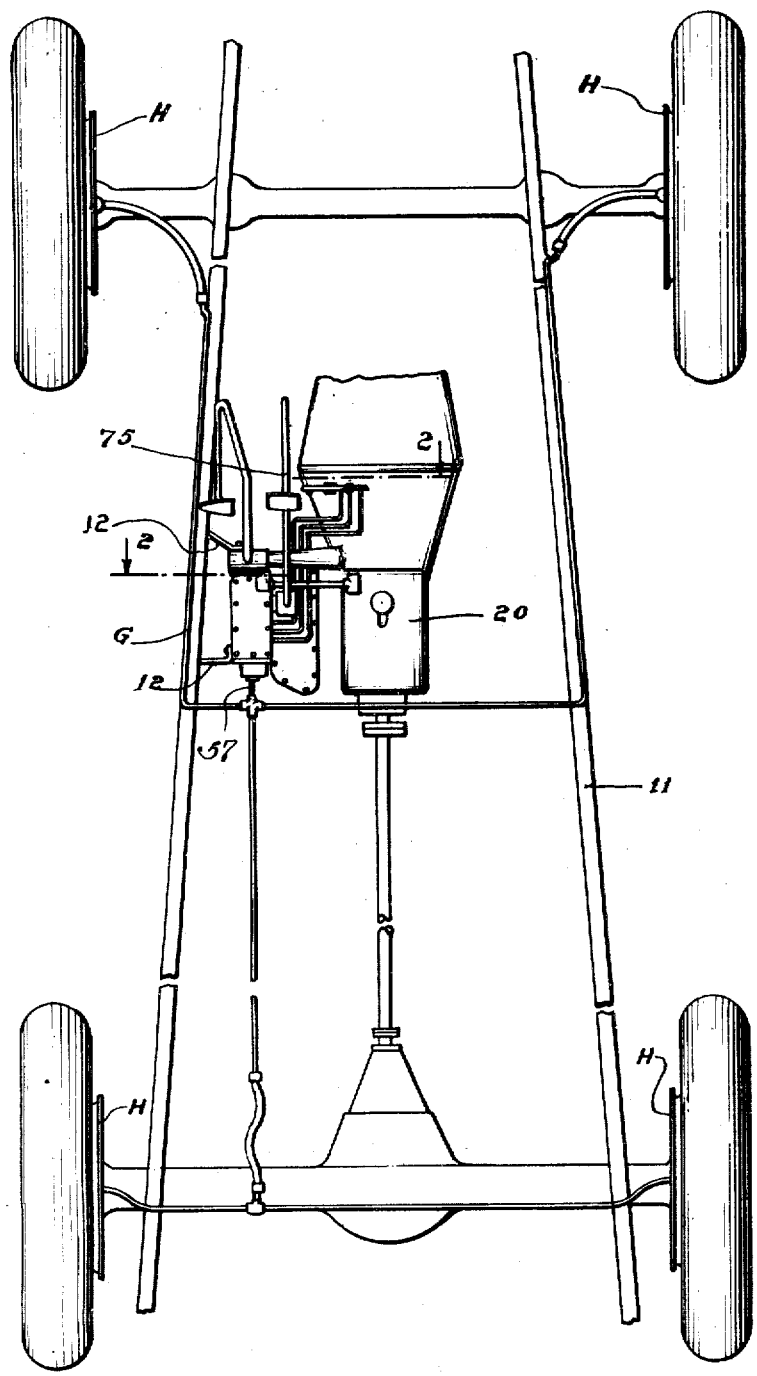
Fig. 1 is a top plan view in a chassis embodying the invention.

Fig. 3 is an enlarged sectional view of a part of the mechanism shown in Fig. 2, Fig. 4 is a sectional view of a part of the mechanism illustrated in Fig. 2, Fig. 5 is a sectional view along the lines 5—5 of Fig. 4, Fig. 6 is a sectional view along the line 6—6 of Fig. 4, Fig. 7 is a sectional view along the lines 7—7 of Fig. 5, and Fig. 8 is a sectional view along the line 8—8 of Fig. 6.

In general, the invention consists of a pump A forming a source of fluid pressure, a pressure reservoir B for storing fluid under pressure, a manually actuable pressure producing means C including a cylinder D for augmenting the pressure supplied by the pump A and a manually actuated controlling means E, for controlling the ingress of fluid pressure to the cylinder of the pressure producing means C, which is operatively coupled with the accelerator F of the vehicle. Fluid pressure from the mechanism described is conducted through tubular conductors G to the wheel braking mechanisms H, the structure of which is fully disclosed in Patent 1,468,600, issued September 18, 1923, to Malcolm Loughead.

The pump A, reservoir B and cylinder D with their associate parts are confined within a casing 10 which is mounted upon the frame 11 of the chassis, at one side of the transmission housing by plates 12. The casing 10 is oil-tight and has a pair of covers 13 and 14, the cover 14 serving as a closure for that portion of the casing below the level of fluid therein and therefore made fluid tight.

The pump A is of the gear type consisting of a pair of meshed gears 16, one of which is connected to an upright shaft 17 and extending exteriorly of the casing and which is driven through bevel gear connections 18 and a short shaft 19 by the gear train within the transmission housing 20 of the vehicle. This form of connection is well known in the art, particularly in the case of speedometer connections and needs no further explanation.

Pump A has an intake port 22 into which fluid 23 from the casing is drawn and which is delivered through a delivery port 24.

Fluid pressure from the pump is conducted from the port 24 through a passage 25 provided with a spring ball type valve 26 to the cylinder 27 of the fluid reserve reservoir B.

The fluid reserve reservoir further consists in a hollow piston 28 as shown in Fig. 6, a piston packing cup 29 at the inner end of the piston and a powerful compression spring 30 partially received within the piston for urging the piston inwardly of the cylinder. Pressure within the fuel reservoir B is therefore determinable by the pressure exerted by the spring 30 upon the piston so long as the piston is free to move.

Means for shutting off the supply of fluid pressure to the cylinder 27 from the pump A when the cylinder 27 contains its maximum supply of fluid under pressure is provided in a valve 35 interposed between the delivery port 24 and the passage 25. The valve 35 is actuated by an arm 37 which carries a pair of rollers 8 and 9 and is held in either of its two positions by a spring 38. When the piston moves to the left as viewed in Fig. 5 a bead 36 at the end of the piston will engage roller 8 and rotate arm 37 until it passes its vertical position, when it will snap to the dotted line position by virtue of the spring 38. In moving forward the bead 36 of the piston engages roller 9 to return the valve to the position shown in full lines in Fig. 5. When the valve is actuated to the position shown in dotted lines in Fig. 5, fluid pressure from the pump will be delivered through a relief passage 39 directly into the casing, the pump load being reduced to its maximum. When, however, fluid has been exhausted from the reservoir, the piston will recede and the valve 35 will return to the position shown in full lines to emit fluid from the pump to to cylinder 27 in the manner described.

The fluid pressure is connected by means of a passage 40 and a tube 41 with the manually controllable valve E which valve is operated by the foot of the driver as hereinafter described.

The valve E consists in a cylinder 42 having a reciprocal valve piston 43 therein normally held in elevated position by means of a spring 44 in which position the valve piston closes a port 45 communicating with the cylinder, to which the tube 41 is connected. No fluid is permitted to pass from the reservoir B when the valve piston is elevated.

The valve piston 43 has a circumferential groove 46 on its outer face and radial openings 47 communicating therewith which in turn communicate with a downwardly extending port 48 through the lower end of the piston. Depression of the valve piston to cause the groove 46 to register with the port 45 permits fluid from the reservoir B to enter the chamber formed by the cylinder 42 beneath the piston. This portion of the cylinder is connected by means of a passage 49 with a tube 50 the opposite end of which communicates with an annular chamber 51 encompassing the outer wall of the cylinder D at a point immediately in front of the packing cup 53 of the piston 54, when at rest, forming a part of the manually operable pressure producing means C. The side walls of the cylinder D registering with the chamber 51 are provided with radial perforations 55 by means of which fluid from the chamber may enter the cylinder D. The cylinder D communicates by means of an outlet passage 56 with a tube 57 which is connected to the tubular conductors G and thence to the wheel brake cylinders at H.

The upper end of the piston valve 43 extends upwardly and is provided with a cap 58 thereover which protrudes through an opening 59 in the floor board 60 of the vehicle. A compression spring 61 is disposed within the cap 58 above the upper end 62 of the valve piston. A foot treadle 65 pivotally mounted at 66 of its midpoint is fixed to the floor board 60 at 67, one end of which overlies the accelerator control F and the other end the cap 58. The length of the treadle 65 is sufficient to permit the driver to shift his foot from one side of the pivotal point 66 to the other so that downward pressure may actuate either the accelerator control F or the piston valve 43.

In order to relieve back pressure from the wheel cylinder brake mechanism H and the cylinder D, a relief passage 70 is provided through the cylinder 42 which registers with the groove 46 in the piston valve when the valve is elevated in the position shown in the Fig. 3. The passage 70 communicates by means of the tube 71 to the interior of the casing 10 so that surplus oil will be delivered back into the reservoir as the pistons in the wheel cylinders recede.

Means for augmenting the pressure in the cylinder D and therefore in the fluid line of the braking mechanism, which is admitted thereto from the fuel pressure reservoir B through the manually controlled valve mechanism E is provided in a foot pedal 75 which takes the place of the ordinary foot brake pedal. This pedal 75 is keyed to a shaft 76 which extends within the casing 10 and is pivotally mounted thereupon. The shaft 76 has a radially extending arm 78 which engages with the piston 54. A compression spring 79 disposed within the cylinder D serves to normally maintain the piston in the position shown in Fig. 6 whereupon actuation of the foot pedal 75 will move the piston 54 into cylinder D to augment the fluid pressure therein communicated to the vehicle wheel brake cylinders. When the piston 54 with its packing cup 53 is moved in advance of the radial passages 55 the fluid pressure within the cylinder D is trapped therein and is not free to escape should the piston valve 43 be elevated, until the foot pedal is allowed to recover its normal position.

In operation the driver normally keeps his right foot upon the treadle 65 to the left of its pivotal support 66 so that downward pressure will operate the accelerator control F to control the speed of the vehicle. The left foot is used for manipulation of the clutch pedal in precisely the same manner as in controlling a vehicle not equipped with my improved hydraulic brake. During the operation of the vehicle the pump A is in operation to build up fluid pressure in the reservoir B and maintains a predetermined pressure by virtue of the automatically operated valve 35 in the manner described.

When it is desired to apply the brakes the right foot of the driver is shifted along the treadle 65 to the right of its pivotal support 66 and pressure applied to depress the piston valve 43. With this movement there is a concurrent and proportional releasing of the pressure upon the accelerator control F so that the engine speed is reduced to idle. As the piston valve 43 is depressed the annular groove 47 therein registers with port 45 which communicates by means of tube 41 to reservoir B, thus admitting fluid under pressure from the reservoir to the interior of valve chamber 42. This fluid pressure is further transmitted through tube 50 to the wheel brake cylinder mechanism H through tubular conductors G. The brakes are thus applied to reduce or stop the speed of the vehicle, depending upon the quantity of fluid pressure which is admitted to the wheel brake cylinder mechanism H, which in turn is proportionate to the time during which the valve 43 is depressed to register the annular groove 47 with port 45.

If further pressure in the wheel cylinders is desired, foot pedal 75 is depressed, which moves piston C in cylinder D through which fluid pressure passes from tube 50 to the tubular conductors G so as to close the radial openings 55 for admitting fluid pressure to cylinder D and trap the fluid within cylinder D. Continued movement of cylinder C therefore augments the fluid pressure in cylinder D and therefore the pressure conducted to wheel cylinder mechanism H.

Pressure may be released from valve 43 at this time without relieving pressure at the wheel cylinders. The wheel cylinder pressure will be maintained until the foot pedal 75 is retracted sufficient to permit piston C to move beyond the radial means 55 in the cylinder wall, whereupon the back pressure from the wheel cylinder mechanism H is conducted through tube 50 to the valve chamber 42 and thence through relief port 70 to the casing 10, where it is accessible to the intake port 22 of pump A. It is assumed at this time that the valve 43 is elevated as shown in Figure 3.

I claim:

1. In a fluid brake system, a wheel brake mechanism, a fluid pressure source connected with the wheel brake mechanism, a manually controllable valve for controlling the admission of fluid pressure to the wheel brake mechanism, a foot accelerator, a foot treadle pivotally mounted at its midpoint and adapted to serve as a foot accelerator control, one end associated with the valve and the other end associated with the foot accelerator whereby the operator by shifting his foot along the treadle may operate the valve or the accelerator at will, and manually operable means for augmenting the fluid pressure admitted to the wheel brake mechanism.

2. In a fluid brake system, a wheel brake mechanism, a driven pump for supplying fluid under pressure, a reservoir for storing fluid pressure supplied by the pump, a manually controllable valve for controlling the admission of fluid pressure from the reservoir to the wheel brake mechanism, and manually actuated means for augmenting the fluid pressure admitted to the wheel brake mechanism, said manually actuating means providing a pressure conduit connection between said valve and said wheel brake mechanism.

3. In a fluid brake system, a wheel brake mechanism, a driven pump for supplying fluid under pressure, a reservoir for storing fluid under pressure supplied by the pump, a manually controllable valve for controlling the admission of fluid pressure from the reservoir to the wheel brake mechanism, a foot accelerator manually actuated means for augmenting the fluid pressure admitted to the wheel brake mechanism, and a foot treadle pivotally mounted at its midpoint and adapted to serve as an accelerator control, said treadle having one end overlying the manually controllable valve and the other end controlling the accelerator.

4. In a fluid brake system, a vehicle wheel brake mechanism, a fluid tight casing, fluid in said casing, fluid pressure producing means in the casing receiving its fluid from within the casing, a fluid pressure reservoir submerged in the fluid in the casing for storing fluid pressure supplied by the fluid pressure producing means, means for conducting fluid pressure from the reservoir to the wheel brake mechanism, a manually controllable valve for controlling the admission of fluid pressure to the wheel brake mechanism, and an auxiliary pressure producing means consisting of a cylinder and a piston submerged in the fluid in the casing and augmenting the fluid pressure supplied to the wheel brake mechanism, the auxiliary pressure producing means being manually actuated.

5. In a fluid pressure brake system, a vehicle wheel braking mechanism, a fluid-tight casing, fluid in the casing, means for supplying fluid from the casing under pressure, means for conducting fluid pressure so formed to the wheel braking mechanism, manually controllable means for controlling the admission of said fluid pressure to the wheel braking mechanism and manually actuated means for augmenting the fluid pressure supplied by the pressure producing means including a cylinder and a piston entirely submerged in the fluid in the casing.

6. In a fluid brake system, a wheel brake mechanism, a master cylinder, a piston reciprocable therein, a source of fluid pressure, and means for connecting the source of fluid pressure to the wheel brake mechanism through the master cylinder, said connecting means being disconnected by the movement of the piston whereby a greater fluid pressure is produced in the master cylinder than the pressure due to said fluid pressure source.

In witness whereof, I hereunto subscribe my name this 1st day of September, 1927.

DONALD O. SCOTT.

CERTIFICATE OF CORRECTION.

Patent No. 1,886,309.   November 1, 1932.

DONALD O. SCOTT.

It is hereby certified that error appears in the printed specification of the above numbered patent requiring correction as follows: Page 2, line 33, for "maximum" read "minimum"; page 3, line 95, claim 3, strike out the word "under"; and line 121, claim 4, for "and" read "for"; and that the said Letters Patent should be read with these corrections therein that the same may conform to the record of the case in the Patent Office.

Signed and sealed this 17th day of January, A. D. 1933.

(Seal)   M. J. Moore,
Acting Commissioner of Patents.

controllable means for controlling the admission of said fluid pressure to the wheel braking mechanism and manually actuated means for augmenting the fluid pressure supplied by the pressure producing means including a cylinder and a piston entirely submerged in the fluid in the casing.

6. In a fluid brake system, a wheel brake mechanism, a master cylinder, a piston reciprocable therein, a source of fluid pressure, and means for connecting the source of fluid pressure to the wheel brake mechanism through the master cylinder, said connecting means being disconnected by the movement of the piston whereby a greater fluid pressure is produced in the master cylinder than the pressure due to said fluid pressure source.

In witness whereof, I hereunto subscribe my name this 1st day of September, 1927.

DONALD O. SCOTT.

CERTIFICATE OF CORRECTION.

Patent No. 1,886,309.  November 1, 1932.

DONALD O. SCOTT.

It is hereby certified that error appears in the printed specification of the above numbered patent requiring correction as follows: Page 2, line 33, for "maximum" read "minimum"; page 3, line 95, claim 3, strike out the word "under"; and line 121, claim 4, for "and" read "for"; and that the said Letters Patent should be read with these corrections therein that the same may conform to the record of the case in the Patent Office.

Signed and sealed this 17th day of January, A. D. 1933.

(Seal)

M. J. Moore,
Acting Commissioner of Patents.

CERTIFICATE OF CORRECTION.

Patent No. 1,886,309. November 1, 1932.

DONALD O. SCOTT.

It is hereby certified that error appears in the printed specification of the above numbered patent requiring correction as follows: Page 2, line 33, for "maximum" read "minimum'; page 3, line 95, claim 3, strike out the word "under"; and line 121, claim 4, for "and" read "for"; and that the said Letters Patent should be read with these corrections therein that the same may conform to the record of the case in the Patent Office.

Signed and sealed this 17th day of January, A. D. 1933.

(Seal)

M. J. Moore,
Acting Commissioner of Patents.